Aug. 14, 1928.  
E. F. BALDWIN ET AL  
1,680,358  
MACHINE FOR MAKING FIBER REED  
Filed March 25, 1926  
8 Sheets-Sheet 1

Aug. 14, 1928.

E. F. BALDWIN ET AL 1,680,358

MACHINE FOR MAKING FIBER REED

Filed March 25, 1926          8 Sheets-Sheet 4

Aug. 14, 1928.

E. F. BALDWIN ET AL

1,680,358

MACHINE FOR MAKING FIBER REED

Filed March 25, 1926

Patented Aug. 14, 1928.

1,680,358

UNITED STATES PATENT OFFICE.

EARL F. BALDWIN AND FRANK E. WOODS, OF GARDNER, MASSACHUSETTS, ASSIGNORS TO AMERICAN FIBRE CORPORATION, OF GARDNER, MASSACHUSETTS, A CORPORATION OF MASSACHUSETTS.

MACHINE FOR MAKING FIBER REED.

Application filed March 25, 1926. Serial No. 97,468.

This invention relates to a machine for manufacturing fiber reed, a product which has come into wide use as a substitute for flat reed in weaving coverings for baby carriages and other similar articles. In the manufacture of such fiber reed, a strip of strong heavy fiber, such as kraft paper, is first folded lengthwise, and the folded paper is then firmly pressed into the form of a straight strip of fiber reed of reduced width but of increased thickness. The strip is gummed to preserve its tightly folded condition.

It is the general object of our invention to provide an improved machine for the manufacture of such fiber reed, said machine involving many novel features of construction and operation, and having its component parts assembled to form fiber reed by a new and improved process.

One important feature of our invention relates to the provision of an improved mechanism for folding, breaking down and pressing the fiber soon after it enters the machine.

Our invention also includes novel unfolding and gumming mechanism, novel refolding and repressing mechanism and an improved winding mechanism, all of which together with our improved process, are described but not claimed herein and form the subject matter of additional applications filed herewith. Certain features of the folding and pressing mechanism have been presented in a divisional application, Serial No. 260,157, filed March 8, 1928.

Our invention further relates to certain arrangements and combinations of parts which will be hereinafter described and more particularly pointed out in the appended claims.

Drawings:

A preferred form of the invention is shown in the drawings in which

Fig. 26ª is a detail perspective view of one of the guide arms for the winding mechanism;

Fig. 27 is an enlarged sectional elevation of the refolding and repressing mechanism, taken along the line 27—27 in Fig. 26;

Fig. 29 is a partial plan view of a guide and stripping device, looking in the direction of the arrow 29 in Fig. 27;

Fig. 36 is a partial end elevation of certain driving mechanism for the winding reels, taken along the line 36—36 in Fig. 26;

Fig. 37 is an enlarged elevation of the traverse feed of the winding mechanism; and Fig. 38 is a detail view of a shipper handle to be described.

General operation.

Figure 1:
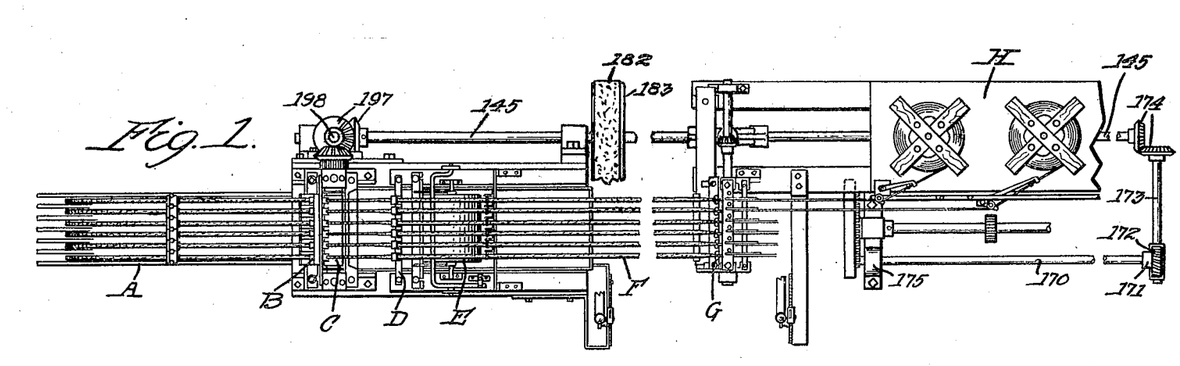
Fig. 1 is a plan view of our improved machine for making fiber reed.

It is believed that the construction of our improved reed-making machine will be more easily understood after a brief consideration of the general system of operation. Referring to Fig. 1, our improved machine comprises a series of co-operating mechanisms as follows:—A fiber supplying mechanism A, a folding mechanism B, a pressing and sizing mechanism C, an unfolding mechanism D, a gumming and scraping mechanism E, a drying portion F, a refolding and repressing mechanism G, and a winding mechanism H.

The fiber is supplied in the form of large rolls R, each comprising a very great length of fiber of a comparatively narrow width. A succession of these rolls R are mounted in the supply mechanism A and the ungummed fiber strips are led therefrom through trumpets in the folding mechanism B to grooved and ribbed presser rolls in the pressing and sizing mechanism C. The fiber strips are drawn through the folding trumpets by the presser rolls and are delivered from the rolls in folded condition and of exact width, with the fiber well broken down at the folds but still in an ungummed condition. The folded fiber is then unfolded by the mechanism D and in its unfolded condition passes over the gumming cylinder in the mechanism E and is then drawn past the scraper to remove the surplus gum or glue.

The gumming mechanism E and the refolding and repressing mechanism G are spaced substantially apart to provide a drying portion F in which the freshly gummed fiber has a chance to partially dry and become very sticky or "tacky" before it passes through the refolding and repressing mechanism G.

In this mechansim, a pair of cooperating folding rolls, preferably mounted on vertical axes, are provided for loosely refolding the fiber reed, after which it is drawn through a second set of grooved and ribbed presser rolls by which it is again sized and firmly pressed and from which it is delivered in finished condition to the winding mechanism H.

The fiber from which the reed is made is of stiff and heavy material and it has been found impractical to gum and fold the fiber at a single operation. We have discovered, however, that very satisfactory results may be obtained by first folding and firmly pressing the fiber in an ungummed condition, thus breaking down the fiber at the fold lines, and by thereafter unfolding, gumming, refolding and repressing the fiber to form the finished reed.

Having thus described the general system and operation of our improved machines, we will now described the different mechanisms contained therein.

Supply mechanism.

Figure 2:
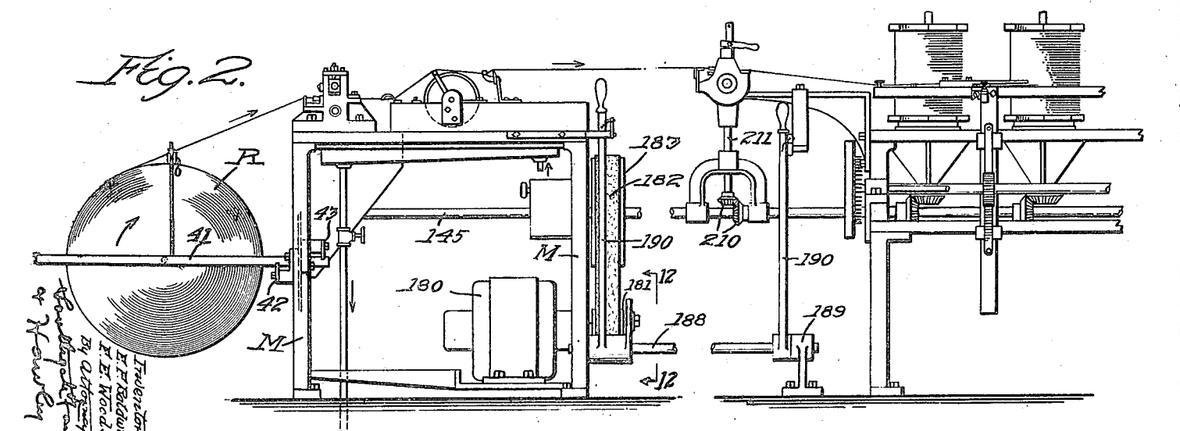
Fig. 2 is a front elevation thereof.
Figures 3, 4, 5, 6, 7, 8:
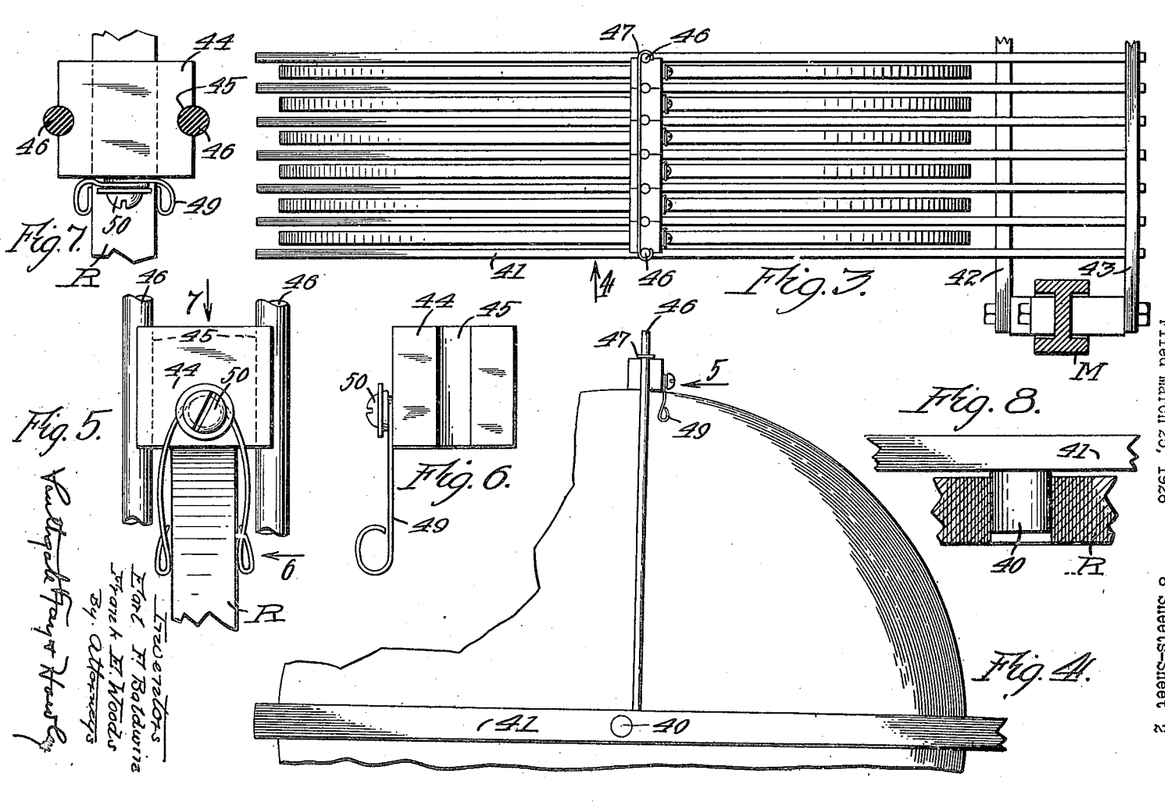
Fig. 3 is a plan view of the fiber supply mechanism or reel.
Fig. 4 is a partial side elevation thereof, looking in the direction of the arrow 4 in Fig. 3.
Fig. 5 is a detail end elevation of the retarding and friction device, looking in the direction of the arrow 5 in Fig. 4.
Figs. 6 and 7 are a side elevation and plan of the parts shown in Fig. 5, looking in the direction of the arrows 6 and 7 in said figure.
Fig. 8 is a detailed sectional view showing one of the roll supports.

The supply mechanism A is indicated generally in Figs. 1 and 2 and is shown in detail in Figs. 3 to 8 inclusive. Each roll R is mounted upon a stud 40 (Fig. 8) in the side of a supporting bar 41 which is detachably secured in position by cross bars 42 and 43 mounted in fixed position on the frame M of the machine.

The supporting bars 41 are provided with notches as indicated in Fig. 2 to fit the cross bars 42 and 43. Any one of the bars 41 may be easily removed by raising the outer end of the bar and then removing the same endwise from the supporting frame. In this way, any one of the rolls R may be quickly and easily replaced.

We have also provided means for frictionally retarding the feed from each separate roll R. For this purpose, we provide weights 44 having grooves 45 in their side faces to receive guide rods 46 fixed in the supporting bars 41 and extending upwardly therefrom. A tie rod 47 joins the two outer rods 46 and holds the entire series of weights in the desired relationship. Friction springs 49 are pivoted at 50 on each weight 44 and yieldingly engage the two parallel sides of the roll R, the springs being self-centering on their pivots 50.

As the rolls decrease in size, the weights 44 slide downward between the guide rods 46 and the springs 49 retain their operative frictional relation to the rolls R. Rotation of the rolls is thus retarded both by the yielding pressure of the springs 49 and by the gravity pressure of the weights 44.

Folding mechanism.

Figure 9:
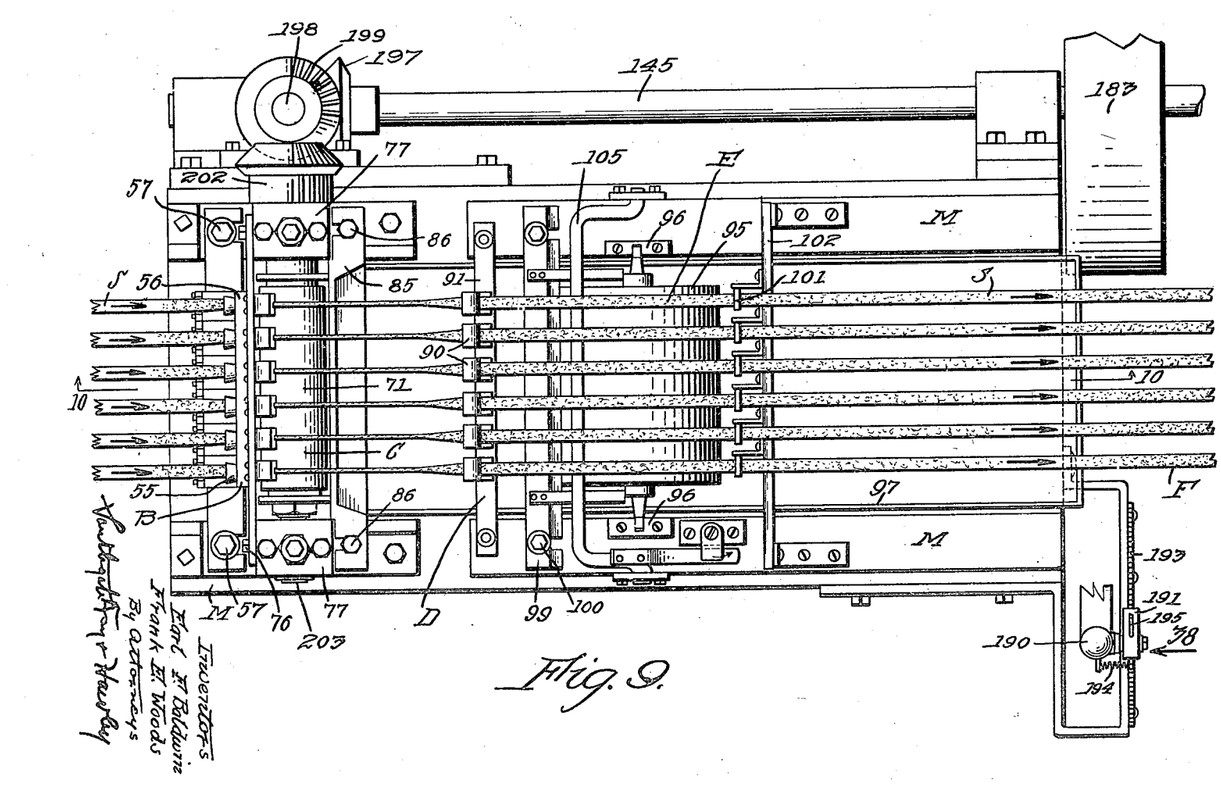
Fig. 9 is an enlarged plan view of the folding, unfolding, and gumming mechanism forming a portion of our improved machine.
Figure 10:
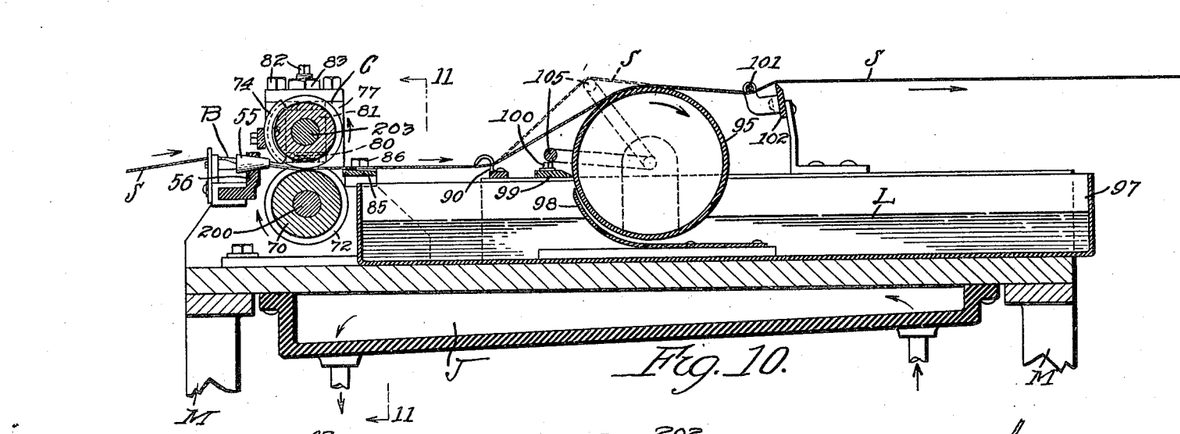
Fig. 10 is a sectional elevation of the same parts, taken along the line 10—10 in Fig. 9.

The strips S of fiber are drawn from the rolls R and are then acted upon by the folding mechanism B shown generally in Figs. 9 and 10 and in detail in Figs. 13 to 18.

Our improved folding mechanism comprises a series of trumpets 55 mounted in a cross bar 56 detachably secured to the frame M by bolts 57 (Fig. 9) extending through notches at the ends of the cross bar 56.

Figures 13, 14, 15, 16, 17, 18, 19, 20, 21, 22, 23, 24, 25:
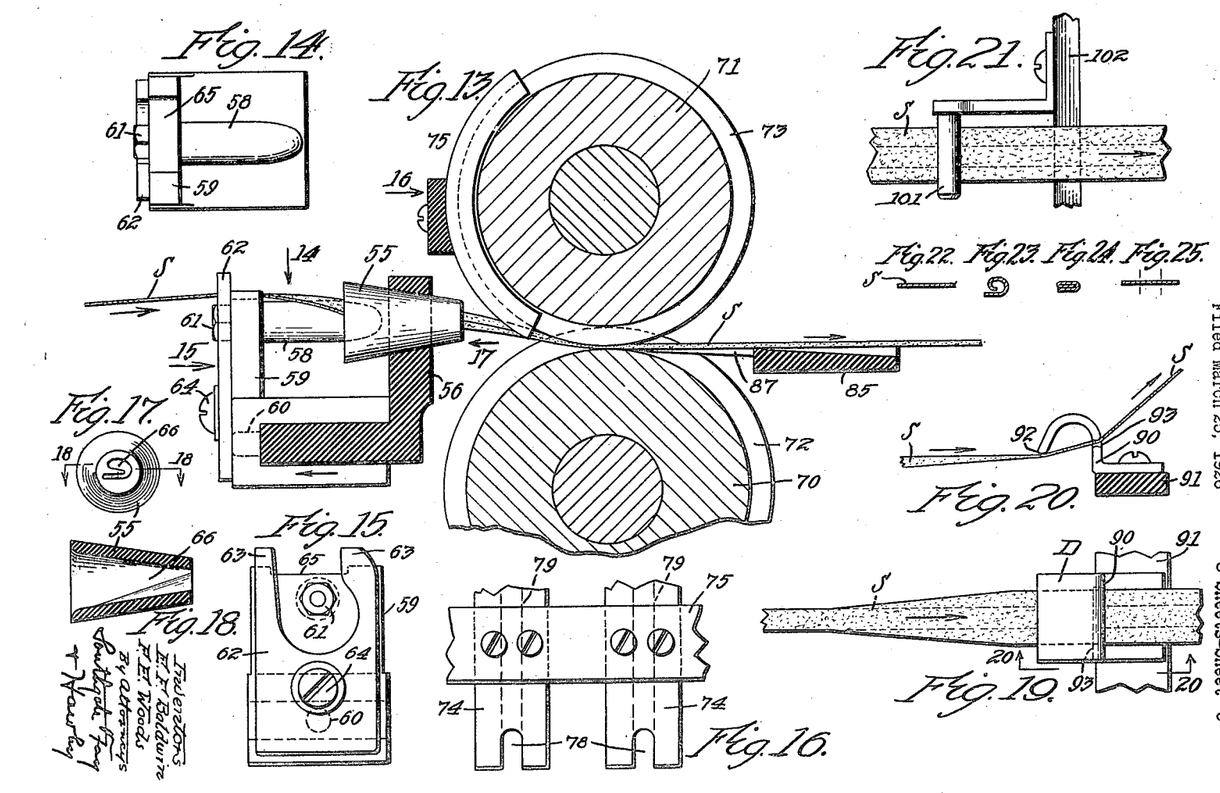
Fig. 13 is an enlarged longitudinal section showing the folding, pressing and sizing mechanism.
Fig. 14 is a detail plan view of the parts of the folding mechanism, looking in the direction of the arrow 14 in Fig. 13.
Fig. 15 is an end elevation, looking in the direction of the arrow 15 in Fig. 13.
Fig. 16 is a partial end elevation of the guide-plates for the presser rolls, looking in the direction of the arrow 16 in Fig. 13.
Fig. 17 is an end view of one of the folding trumpets, looking in the direction of the arrow 17 in Fig. 13.
Fig. 18 is a sectional plan view of the trumpet, taken along the line 18—18 in Fig. 17.
Fig. 19 is a plan view of one of the unfolding devices.
Fig. 20 is a side elevation thereof, taken along the line 20—20 in Fig. 19.
Fig. 21 is a plan view of a guide and scraper by which surplus gum is removed from the fiber strip.
Figs. 22, 23, 24 and 25 are sectional views illustrating successive steps in the folding and unfolding of the ungummed fiber.

The trumpets 55 are preferably formed of porcelain or some other vitrified product and are each provided with a recess 66 of the peculiar section and outline indicated in Figs. 17 and 18, the walls of said recess being so disposed that the fiber strip S, which leaves the roll R in the flat condition indicated in Fig. 22, will be delivered from the trumpet 55 in the partially folded condition indicated in Fig. 23.

A plug or anvil 58 is provided for each trumpet 55, the anvil being of substantial circular cross section and having a tapered and rounded outer end projecting into the open rear end of its trumpet 55 as indicated in Fig. 13. Each anvil 58 is mounted on a bracket 59 which is forked at its lower end to slip over the cross bar 56 which supports the trumpets. A lug 60 (Fig. 13) is provided on the cross bar for each bracket 59 and enters a recess therein to correctly position the bracket and anvil in relation to the associated trumpet. Each bracket is thus readily removable from the cross bar, thus permitting the machine to be easily cleaned or inspected. Each anvil 58 is secured to its bracket 59 by a suitable binding screw 61.

A guide-plate 62 (Fig. 15) is provided for each trumpet 55, said guide-plate being recessed to provide guiding portions 63 engaging the opposite edges of the fiber strip S. Each guide-plate is pivoted to its corresponding bracket 59 and is secured in adjusted angular position by a clamping screw 64. Each bracket 59 is also provided with a slightly depressed upper edge portion 65 over which the strip S is drawn.

The guide-plates 62 are very important elements of our invention, as it is desirable that the reed when folded shall have the section shown in Fig. 24, with the edge of the outer folded layer exactly aligned with the edge of the reed. This alignment is of course controlled by the position of the longitudinal fold lines and the position of these fold lines may be varied transversely according to the adjustment of the guide-plate 62. By slightly adjusting the guide-plate to one side or the other, the edge of the outer fold may be easily positioned to exactly co-incide with the edge of the reed.

Pressing and sizing mechanism.

Figure 11:
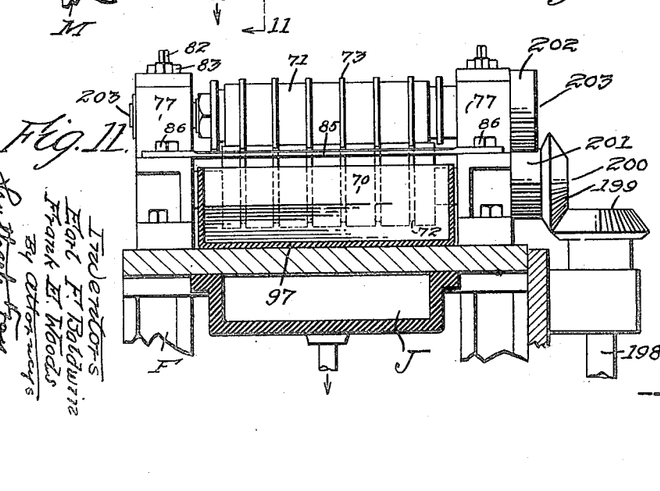
Fig. 11 is a transverse sectional elevation, taken along the line 11—11 in Fig. 10.

The pressing and sizing mechanism C is indicated generally in Figs. 9 to 11 and certain details thereof are best shown in Figs. 13 and 16.

This mechanism comprises a lower presser roll 70 and an upper presser roll 71. The lower roll 70 is provided with a groove 72 for each folding trumpet 55 and the upper roll 71 is provided with corresponding ribs 73.

Each folded strip S is delivered direct from one of the trumpets 55 to one of the grooves 72, as clearly shown in Fig. 13, and is compressed firmly in the bottom of the groove by a corresponding rib 73 on the upper presser roll 71.

This operation breaks down the stiff heavy fiber at the fold lines, and also accurately sizes the fiber reed, the final width thereof being determined by the width of the groove 72, as the flattening of the reed causes it to expand laterally to the extreme limits of the groove 72 in which it is confined.

Guide members 74 (Fig. 16) are mounted upon a cross bar 75, which cross bar is secured by bolts 76 (Fig. 9) to the bearing blocks 77 of the upper roll 71. These guide members 74 are of segmental shape and are provided with recesses 78 at their lower edges through which the folded strips S are guided to the grooves 72. The guide members 74 are also provided with segmental grooves 79 (Fig. 16) to clear the ribs 73 of the presser roll 71.

Springs 80 (Fig. 10) support the journal boxes 81 in the upper bearing blocks 77 and set screws 82 and lock nuts 83 are provided for forcing the boxes 81 positively downward to the desired spaced relation with the lower roll 70. The rolls are to be adjusted so that the space between the ribs 73 and the bottoms of the groove 72 is just sufficient to permit passage of the folded and compressed fiber reed.

A stripper plate 85 (Figs. 9, 10, and 13) is detachably secured adjacent the presser rolls by bolts 86 (Fig. 9). The stripper plate 85 is also provided with fingers 87 (Fig. 13) which extend into the grooves 72 of the rolls 70 and remove the reed therefrom as it leaves the bite of the rolls. The construction of the stripper plate and fingers is essentially like the similar stripper provided for the repressing rolls and shown in plan view in Fig. 29.

Unfolding mechanism.

The unfolding mechanism D is clearly shown in Figs. 9, 19, and 20, and comprises a series of unfolding devices 90 secured to a cross bar 91 supported on the frame M of the machine. Each device 90 has a substantially U-shaped upward projection provided with a strip-engaging edge 92 and a transverse guide slot 93. As the folded fiber strip S approaches one of the unfolding devices 90, it is opened out to substantially its original flat condition by successive engagement with the edge 92 and the upper wall of the slot 93. The strip S is delivered from the unfolding device in the condition shown in Fig. 25, being substantially flat but being provided with well defined fold lines, along which the strip may be easily refolded.

*Gumming mechanism.*

The gumming or gluing mechanism E is best shown in Figs. 9 and 10 and comprises a freely rotatable drum 95 mounted on pivot bearings 96 and having its lower portion dipping into the gum or glue L contained in a tank 97 (Fig. 10). A deflector plate 98 is placed in the bottom of the tank 97 to cause the gum or glue to follow the surface of the drum upward and insure complete coating thereof. The gum is kept hot by a jacket J beneath the tank and heated by steam or hot water.

A scraper 99 is adjustably secured by bolts 100 (Fig. 9) adjacent the drum 95 and may be adjusted to leave any desired thickness or coating of gum on the drum.

The strips S of unfolded fiber are drawn from the unfolding devices 90 over the drum 95 as indicated in Fig. 10 and the under surface of each strip is thoroughly coated with gum or glue. The strips S then pass under separate guide rods 101 (Fig. 21) mounted on a fixed cross bar 102 (Fig. 9) secured to the frame F.

The upper edge of the cross bar 102 is sharply bevelled, as indicated in Fig. 10, and forms a second guide and also acts as a scraper by which the surplus gum on the strips S is caused to fall back into the tank 97.

Reference to Fig. 9 will show that the strips S are deflected downward by the guide rods 101 and upward by the scraper 102, thus insuring firm contact of the strips with the scraper as they are drawn therethrough.

*Drying portion.*

The refolding and repressing mechanism G is spaced apart from the gumming mechanism E a distance sufficient to provide a drying portion F of such length that the strips S in being drawn from the gumming mechanism to the refolding devices will have sufficient time to become partially dried, reaching the refolding devices in a very sticky or "tacky" condition. The distance between the mechanisms E and G is not shown to scale in Figs. 1 and 2, but in the actual machine is something like eight or ten feet.

When the machine is stopped, it is desirable that the fiber strips shall be raised clear of the gumming drum 95 and for this purpose we provide a U-shaped support 105 (Figs. 9 and 10) which is normally in the inoperative position shown in Fig. 10, but which may be swung upward to the dotted line position to hold the strips off of the drum when the machine is not in use or when it is desired to remove and clean the drum.

*Refolding and repressing mechanism.*

Figures 27, 29, 30, 31, 32, 32A, 33:
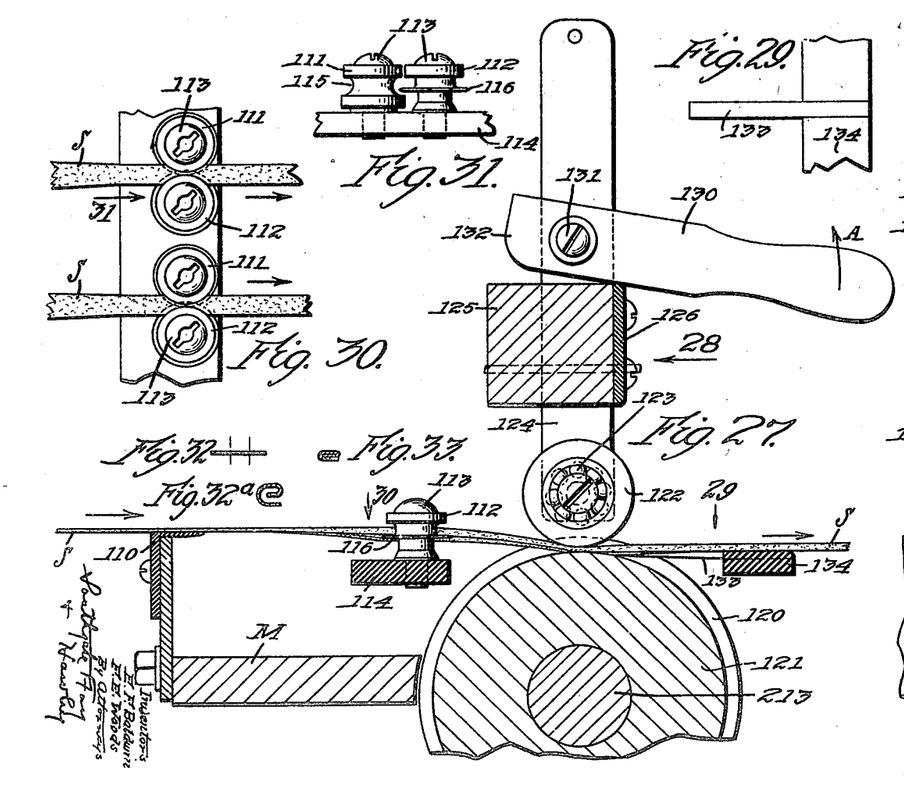
Figure 28:
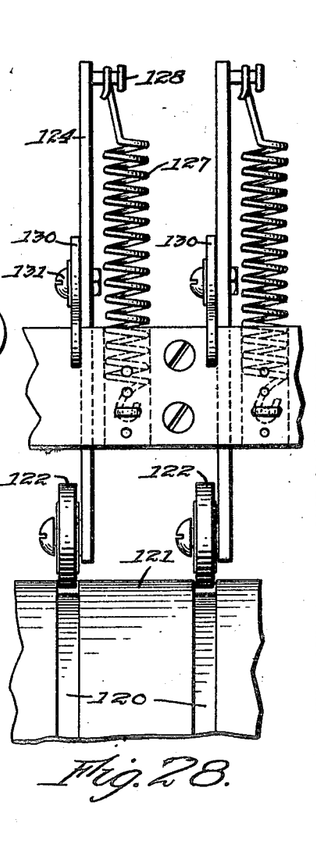
Fig. 28 is an end elevation of the repressing mechanism, looking in the direction of the arrow 28 in Fig. 27.
Figures 30, 31, 32, 34, 35:
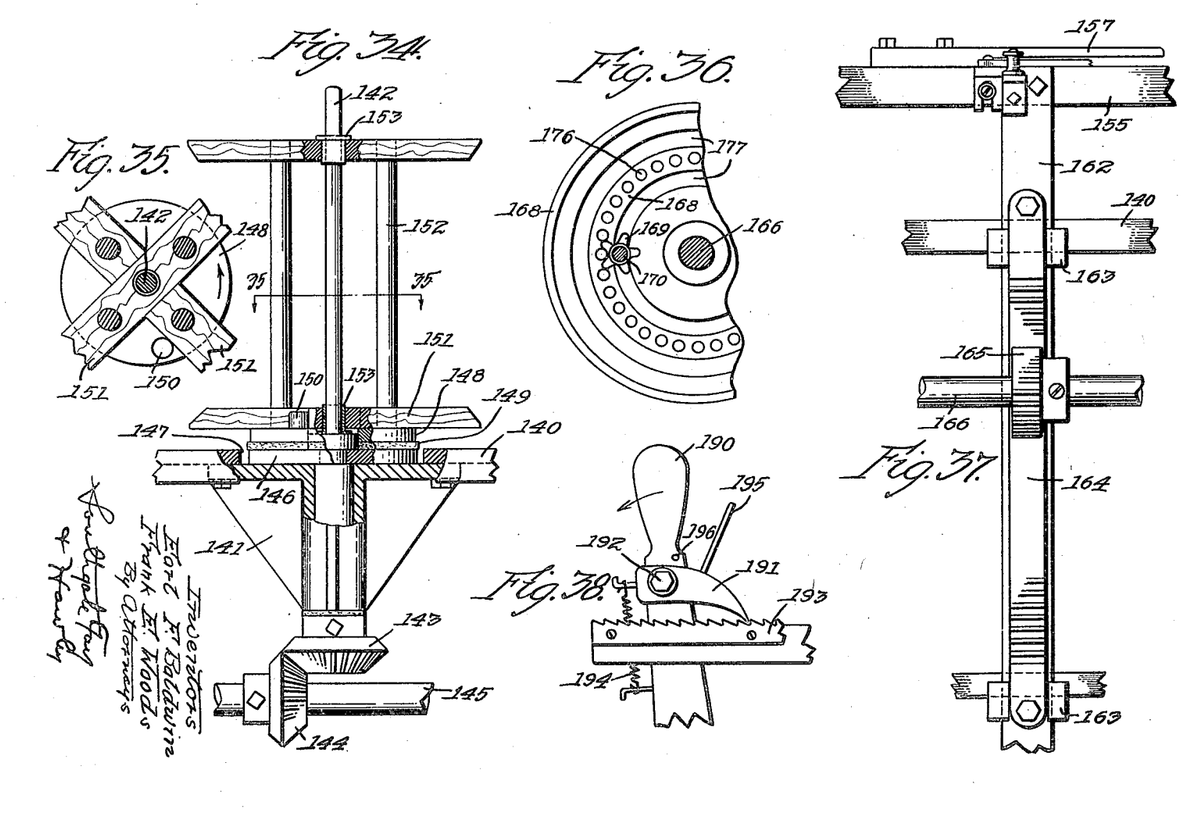
Fig. 30 is a plan view of certain of the refolding devices, looking in the direction of the arrow 30 in Fig. 27.
Fig. 31 is a side elevation of a pair of refolding devices, looking in the direction of the arrow 31 in Fig. 30.
Fig. 32, 32ª, and 33 show additional steps in the formation of the finished reed.
Fig. 34 is a sectional elevation of one of the winding reels.
Fig. 35 is a sectional plan view, taken along the line 35—35 in Fig. 34.

The refolding and repressing mechanism G is best shown in Figs. 28 and 31. The strips S, having become partially dried and very sticky, are drawn over a fixed guide-plate 110 (Fig. 27) and then pass between a pair of refolding rolls 111 and 112, mounted upon vertical studs or bearings 113 in a cross bar 114 bolted to the frame M of the machine. The rolls 111 and 112 are preferably formed of some non-corrosive metal such as brass and rotate freely upon their pivot studs 113. It will be understood that a pair of rolls 111 and 112 is provided for each strip of fiber S.

Each roll 111 is provided with a groove 115 and each roll 112 is provided with a thin flange or rib 116 extending into the groove 115 and adjacent the lower portion thereof.

As the unfolded and gummed strip S is drawn between the rolls 111 and 112, the strip is refolded to the shape shown in Fig. 32ª, with the lower fold passing under the flange 116, and with the upper and middle folds passing above the flange 116.

The refolding device thus described is effective to very quickly and easily refold the fiber strip and is of such a construction that it is not easily obstructed by the gum and loose fiber which is detached from the partially dried and sticky strips as they are pulled between the refolding rolls.

As the strips S pass from the rolls 111 and 112, they enter the grooves 120 of a lower repressing roll 121. A narrow upper presser roll 122 is provided for each strip S and groove 120 and presses the refolded strip firmly into the bottom of the groove 120.

Each upper roll 122 is preferably mounted upon an anti-friction bearing 123 at the lower end of a vertically movable guide-bar 124 and each guide bar 124 is slidable in a vertical slot in a fixed cross bar 125, being held therein by a cover plate 126.

A heavy coil spring 127 is attached to a stud 128 at the upper end of each guide-bar 124 and at its lower end, each spring is secured to the cross bar 125. The springs 127 thus act to press the upper rolls 122 firmly downward into the grooves of the lower roll 121.

A release lever 130 is pivoted to each guide-bar 124, as indicated at 131, and when swung upward in the direction of the arrow A in Fig. 27, the cam end 132 of the lever will engage the upper face of the cross bar 125 and raise and hold the corresponding presser roll out of its groove 120. This feature is very desirable when it is necessary to rethread the fibre through the machine.

The grooved roll 121, cooperating with the upper presser rolls 122, not only draws the strips through the refolding rolls and presses the gummed layers of fiber firmly together, but also acts to re-size the fiber, delivering a finished reed of uniform width. As the reed leaves the bite of the repressing rolls, it is engaged by fingers 133 (Fig. 29) on a stripper plate 134 which clears the strips from the groves in the lower roll.

Winding mechanism.

Figures 20, 26:
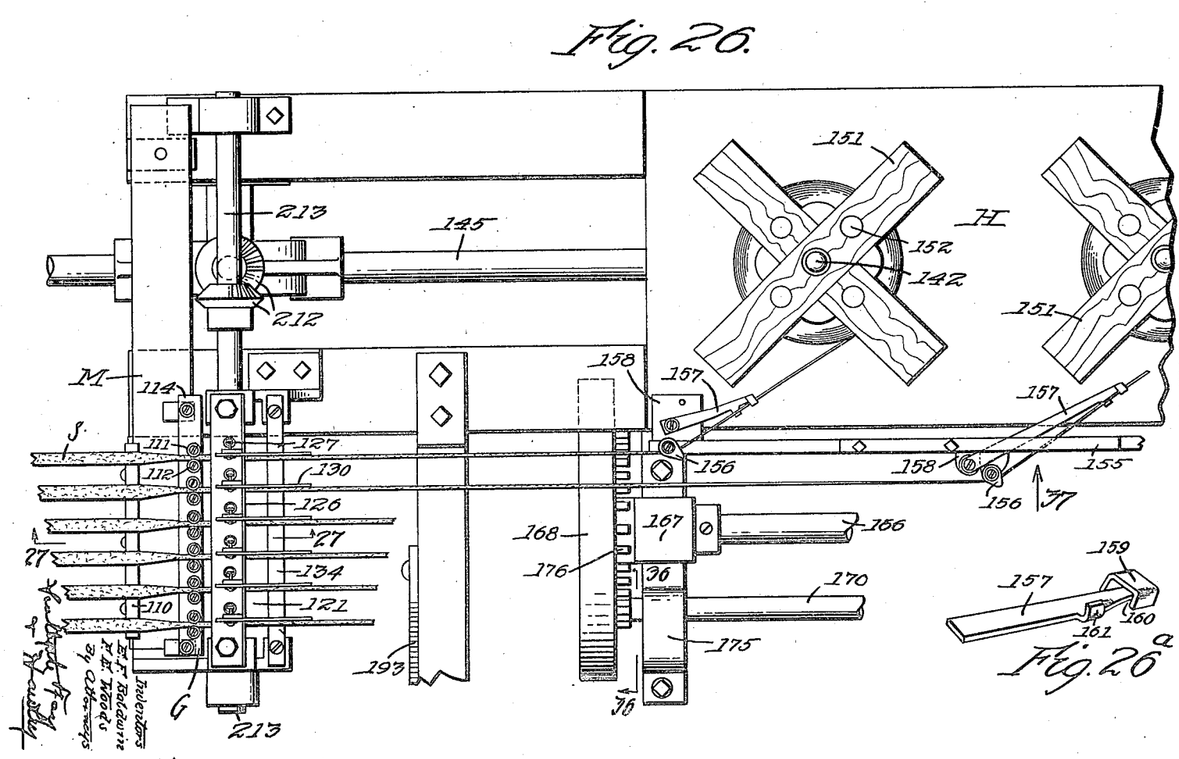
Fig. 26 is an enlarged view of the refolding, pressing and winding mechanism.

As the strips S leave the refolding and repressing mechanism G, they are delivered to the winding mechanism H, shown generally in Figs. 1 and 2 and shown in detail in Fig. 26 and in Figs. 34 to 38.

The winding mechanism is especially designed to receive the finished fiber reeds from a plurality of refolding and repressing devices and to wind each reed upon a separate reel or spool. For this purpose I have provided a winding table 140 provided with bearings 141 (Fig. 34) for a plurality of vertical winding shafts 142, corresponding in number to the number of folding, refolding and repressing devices.

The shafts 142 are provided at their lower ends with bevel gears 143 meshing with corresponding bevel gears 144 on a horizontal shaft 145 supported in bearings below the table 140. The driving connections for the shaft 145 will be hereinafter described.

A disc 146 (Fig. 34) is secured to each vertical shaft 142 and rotates therewith in a recess 147 in the top of the table. A driving ring 148 rests loosely upon the upper face of the disc 146 or may be separated therefrom by a disc 149 of leather or other suitable friction material. The ring 148 is provided with a driving pin 150 adapted to engage one of the cross arms 151 of a winding reel or spool 152. Each spool 152 is provided with bushings 153 fitting loosely on its winding shaft 142.

In actual operation, the winding shafts 142 are continuously rotated at a speed sufficient to wind up the reed as delivered from the refolding and repressing mechanism when the reed is being wound upon the smallest diameter of the spool, and in fact the speed of the shaft 142 is usually slightly in excess of the requirements for the smallest diameter. The reels or spools 152 are thus rotated at the speed required to wind up the reed as it is delivered thereto and the excess speed of the shaft 142 is taken care of by the slip between the driving disc 146 and the driving ring 148.

Each reel is thus driven independently of each other reel and at such speed as will take care of all of the reed delivered thereto. As soon as one reel is filled, it may be removed and replaced by an empty reel without interfering with the operation of any of the other reels which are only partially filled.

Traverse mechanism.

We have also provided a traverse mechanism for laying the reed upon the spools, or reels, this mechanism comprising a traverse bar 155 having a plurality of guides 156 secured thereon and also having a plurality of guide arms 157 pivoted thereto. The guides 156 and guide arms 157 are mounted on brackets or plates 158 secured to the traverse bar 155 and projecting at one side or the other of the bar and to different distances, so as to bring the guides 156 in alignment with the corresponding refolding and repressing devices and so as to pivot the guide arms 157 at points closely adjacent to their associated guides 156.

Each guide arm 157 is formed at its free swinging end substantially as indicated in Fig. 26ª, being provided with an inverted U-shaped guiding portion 159 open at one edge on its lower side as indicated at 160 for convenient threading of the guide arm. A lug 161 retains the threaded reed in position and prevents unthreading thereof.

The traverse bar 155 is mounted upon upright supports 162 (Fig. 37) slidable in fixed bearings 163. Each support 162 is provided with a rack bar 164 engaged by a pinion 165 mounted on a traverse shaft 166. The shaft 166 is rotatable in fixed bearings 167 (Fig. 26) and is provided at one end with a mangle or pin gear 168 (Fig. 36) which is engaged by a mangle pinion 169 mounted on a drive shaft 170 (Fig. 1).

The shaft 170 is rotatable at one end in a substantially fixed bearing 171 and is provided adjacent the bearing with a worm gear 172 engaged by a worm (not shown) on a worm shaft 173 connected by bevel gears 174 to the drive shaft 145 for the winding spindles.

The mangle pinion shaft 170 at its opposite end has a limited sliding movement in a bearing 175, permitting the pinion to engage the pins 176 (Fig. 36) of the mangle gear either on the inside or the outside of the pins, as is usual in such mechanism. The end of the shaft 170 is received in a cam groove 177 (Fig. 36) which passes from the inside to the outside of the row of pins 176 at a particular point in the circumference of the mangle gear 168.

Continued rotation of the mangle pinion shaft 170 thus causes alternate movement of the mangle gear shaft 166 first in one direction and then in the opposite direction and such movement is effective through the pinions 165 and rack bars 164 to raise and lower the traverse bar 155.

Reference to Figs. 1 to 26 will show that the length of the guide arms 157, as well as the position of the pivots therefor, is varied in accordance with the lateral position of the pivots necessitated by the different alignments of the reeds delivered from the repressing mechanism.

Driving mechanism.

Figure 12:
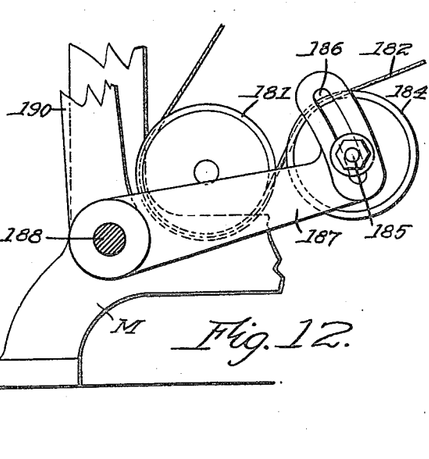
Fig. 12 is a partial end elevation of a belt tightening device by which the operation of the machine is controlled, taken along the line 12—12 in Fig. 2.

We will now briefly describe the driving mechanism by which the several parts of the machine are operated in correct time relation. A motor 180 (Fig. 2) is mounted in the lower part of the frame M and is provided with a driving pulley 181 connected by a belt 182 to a pulley 183 on the main shaft 145 previously described. The belt 182 is loose on the pulleys 181 and 183 but may be tightened by the shipper mechanism best shown in Figs. 12 and 38.

A tightener pulley 184 (Fig. 12) is adjustably secured by a bolt 185 in a slot 186 at the end of an arm 187 fixed to a shipper shaft 188. The shaft 188 is mounted in bearings 189 (Fig. 2) and is provided with shipper handles 190 at each end of the machine.

Each shipper handle is provided with a pawl 191 (Fig. 38) pivoted at 192 on the handle and adapted to engage a fixed ratchet or rack bar 193. A spring 194 acts to yieldingly move the pawl out of engaging position and a pin 195 is mounted in each pawl 191 and extends upward adjacent the end of the handle 190. A stop pin 196 may also be provided for each pawl.

When the operator desires to start the machine, he may grasp either handle 190, pulling the same forward to raise the tightener pulley 184 until the belt 182 is tight enough to rotate the pulley 183. At the same time he presses outward on the corresponding pin 195, locking the handle in the position to which it has been moved.

When it is thereafter desired to stop the machine, the operator merely pulls either handle toward him enough to free the engaged pawl 191, which immediately springs away from engaging position, after which the handles will move freely away from the operator by gravity to loosen the belt 182 and stop the machine.

The driving shaft 145 is connected by bevel gears 197 (Fig. 11) which in turn is connected by bevel gears 199 to the shaft 200 upon which the lower presser roll 70 is mounted. A gear 201 on the shaft 200 engages a gear 202 on the shaft 203 on which the upper presser roll 71 is mounted.

The shaft 145 is also provided with bevel gears 210 (Fig. 2) through which a vertical shaft 211 is continuously rotated. At its upper end, the shaft 211 is connected by bevel gears 212 (Fig. 26) to a shaft 213 which drives the repressing roll 121 (Fig. 27).

The gear ratios and roll diameters are preferably so proportioned that the pressing rolls 70 and 71 will deliver the reed at a very slightly greater speed when the reed is taken up by the repressing rolls 121 and 122. This difference in speed is very slight, but is sufficient to prevent undue strain being placed upon the gummed fiber during the drying operation, at which time it is more easily torn or broken.

Summary.

Having described the general operation of our improved machine for making fiber reed, and having described the different parts of the machine in full detail, it is believed that the construction and operation thereof will be readily understood. Our improved machine, due to its combination of a succession of co-operating mechanisms, has been found very successful in commercial use in producing large quantities of fiber reed with very great rapidity.

While the different mechanism included in our machine in themselves possess many novel features, the success of the machine also depends very largely upon the performance of a series of different operations in a definite timed relation, and this is particularly true of the unfolding, gumming, drying and refolding operations.

Having thus described our invention and the advantages thereof, we do not wish to be limited to the details herein disclosed otherwise than as set forth in the claims, but what we claim is:

1. A machine for making fiber reed having, in combination, a folding device, means for pressing the folded fiber, an unfolding device, means to gum the unfolded fiber, a refolding device, and a repressing mechanism.

2. A machine for making fiber reed having, in combination, a folding device, means for pressing the folded fiber, an unfolding device, means to gum the unfolded fiber, a refolding device spaced sufficiently distant from the gumming means to provide a clear stretch for partially drying the gummed fiber before refolding, and a repressing mechanism said machine having provision for partial drying of the gummed fiber before refolding.

3. A machine for making fiber reed having, in combination, a folding device, means for pressing the folded fiber, an unfolding device, means to gum the unfolded fiber, a refolding device, and a repressing mechanism, said gumming means and said refolding device being spaced substantially apart to permit partial drying of the gummed fiber before refolding.

4. A machine for making fiber reed having, in combination, a folding device, means for pressing the folded fiber, an unfolding device, means to gum the unfolded fiber, a refolding device, and a repressing mechanism the gummed fiber being drawn from the gumming means to the refolding device through a path of a substantial length, said path being sufficiently long to permit partial drying of the gummed fiber before refolding.

5. A machine for making fiber reed having in combination, a folding device, means for pressing the folded fiber, an unfolding device, means to gum the unfolded fiber, a refolding device, a repressing mechanism, and means for spooling the fiber reed as it is delivered from the refolding and repressing mechanism.

6. In a machine for making fiber reed, a folding device, a pressing and sizing device, an unfolding device operative on the folded but ungummed fiber, and means to thereafter gum the unfolded fiber.

7. A machine for making fiber reed which comprises a preliminary longitudinal folding device, means to break down the fiber at the folds and to size the folded fiber to uniform width, and means to thereafter unfold, means to gum, and means to refold said fiber.

8. A machine for making fiber reed having, in combination, gumming mechanism, and folding mechanism and pressing mechanism, said gumming mechanism and said folding mechanism being substantially spaced apart to provide a clear stretch for partially drying the gummed fiber before refolding.

9. A machine for making fiber reed having, in combination, folding, unfolding and gumming mechanisms at one end of the machine, and refolding and pressing mechanisms substantially spaced from said first mentioned mechansims toward the other end of the machine to provide a clear stretch for partially drying the gummed fiber before refolding.

10. In a machine for making fiber reed, a folding device, a pressing and sizing device, an unfolding device operative on the folded but ungummed fiber, means to thereafter gum the unfolded fiber, and means to remove surplus gum therefrom.

11. In a machine for making fiber reed, a folding device, pressing mechanism and unfolding mechanism, gumming mechanism, and means to remove surplus gum from the gummed fiber, said latter means comprising a scraper, and a guide rod engaging the ungummed face of the fiber and deflecting said fiber against said scraper.

In testimony whereof we have hereunto affixed our signatures.

EARL F. BALDWIN.
FRANK E. WOODS.